US010031995B2

(12) United States Patent
Haller et al.

(10) Patent No.: US 10,031,995 B2
(45) Date of Patent: Jul. 24, 2018

(54) DETECTING CIRCUIT DESIGN FLAWS BASED ON TIMING ANALYSIS

(71) Applicant: INTERNATIONAL BUSINESS MACHINES CORPORATION, Armonk, NY (US)

(72) Inventors: Wilhelm Haller, Remshalden (DE); Kurt Lind, Tuebingen (DE); Friedrich Schroeder, Stuttgart (DE); Stefan Zimmermann, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 14/858,040

(22) Filed: Sep. 18, 2015

(65) Prior Publication Data

US 2017/0083658 A1 Mar. 23, 2017

(51) Int. Cl.
*G06F 17/50* (2006.01)

(52) U.S. Cl.
CPC .................. *G06F 17/5081* (2013.01)

(58) Field of Classification Search
CPC .................................................. G06F 17/5081
See application file for complete search history.

(56) References Cited

U.S. PATENT DOCUMENTS

| 7,823,108 | B2 | 10/2010 | Curtin et al. | |
|---|---|---|---|---|
| 8,522,182 | B2 | 8/2013 | Krauch et al. | |
| 8,650,518 | B2 | 2/2014 | Boehm | |
| 8,788,995 | B1 | 7/2014 | Kumar et al. | |
| 2003/0023941 | A1 | 1/2003 | Wang et al. | |
| 2005/0268258 | A1* | 12/2005 | Decker | G06F 17/5081 716/104 |
| 2005/0289486 | A1 | 12/2005 | Caron et al. | |
| 2006/0080627 | A1* | 4/2006 | Murgai | G06F 17/5031 716/113 |
| 2006/0101363 | A1* | 5/2006 | Fry | G06F 17/5031 716/103 |
| 2006/0218515 | A1* | 9/2006 | Byrn | G06F 17/5072 716/113 |
| 2006/0242502 | A1 | 10/2006 | Wang et al. | |

(Continued)

FOREIGN PATENT DOCUMENTS

CN 101727519 B 10/2009

OTHER PUBLICATIONS

Xu, Yang, "Algorithms for Automatic Generation of Relative Timing Constraints," Department of Electrical and Computer Engineering, The University of Utah, May 2011, pp. 1-131.

(Continued)

*Primary Examiner* — Vuthe Siek
(74) *Attorney, Agent, or Firm* — Robert Shatto; Kevin P. Radigan, Esq.; Heslin, Rothenberg, Farley & Mesiti, P.C.

(57) ABSTRACT

An end point report for a design of an electronic circuit may be analyzed. Results of a static timing analysis run are loaded, a path from the loaded results is selected, and technology specific context data is provided. Additionally, a determination is made for every test point of the selected path of design quality parameters for determining a design problem area, and a determination is made for every design problem area, of a root cause by analyzing design problem area data in comparison to related ones of the technology specific context data.

20 Claims, 13 Drawing Sheets

(56) References Cited

U.S. PATENT DOCUMENTS

2007/0226667 A1* 9/2007 Chadwick, Jr. ..... G06F 17/5031
716/113
2008/0195941 A1* 8/2008 Shibuya .............. G06F 17/5031
715/700

OTHER PUBLICATIONS

Krauch, et al., "Detecting Dispensable Inverter Chains in a Circuit Design", U.S. Appl. No. 15/193,456, filed Jun. 27, 2016 (58 pages).
Krauch, et al., Office Action for U.S. Appl. No. 15/193,456, filed Jun. 27, 2016, dated Jun. 14, 2017 (10 pages).
Haller et al., "List of IBM Patents or Patent Applications Treated as Related", U.S. Appl. No. 14/858,040, filed Sep. 18, 2015, dated Jun. 20, 2017 (2 pages).

* cited by examiner

| | | | | | | | |
|---|---|---|---|---|---|---|---|
| --> nclk: | | F M- | 0.00 | 0.00w | -99.74 | 99.00 | 0.00 | | 9999 PI | nclk | nclk_101_c1 |
| --> xxxxxx_yyyyyy_zzzzz_8d_xbox0_0/nclk' | F M- | 0.09 | 99.94 | -0.88 | 99.02 | 0.00 | 1 cw_lcbes_ | f LCB | |
| --> xxxxxx_yyyyyy_zzzzz_8d_xbox0_0/clk | R M+ | 1.03 | 0.00 | -0.88 | 99.34 | 0.00 | 0 cw_lcbes_ | f LCB | |
| --> xxxxxx_yyyyyy_zzzzz_8d_xbox0_0/clk_e | R M+ | 2.03 | 99.55 | -0.88 | 99.37 | 0.00 | 0 cw_lcbes_ | f LCB | |
| -->(a) xxxxxx_yyyyyy_zzzzz_8d_xbox0_0/l1clk | R M+ | 3.58 | 9.01w | -0.88 | 99.51 | 99.66 | 9.23 | 99 cw_lcbes_ | f LCB | |
| xxxxyyyzzzlat_l1clk_dom_8d_1 | | | | | | | | | | |
| N --> xxxxxx_yyyyyy_zzzzz_rq_esc_62/l1clk | R M+ | 4.59 | 99.97 | -0.88 | 99.96 | 99.66 | 9.23 | 99 cw_inv_lat_1h18t | 990 SRL | |
| xxxxyyyzzzlat_l1clk_dom_8d_1 | | | | | | | | | | |
| -->(b) xxxxxx_yyyyyy_zzzzz_esc_62/q_b | F M@L | 5.56 | 9.33w | -0.88 | 99.59 | 99.15 | 9.98 | 1 cw_inv_lat_1h18t | 990 SRL | |
| xxxxyyyzzz_result_rq_q(62) | | | | | | | | | | |
| --> xxxxxx_yyyyyy_zzzzz_rq_q_1i(62)/a | F M@L | 6.89 | 9.05 | -0.88 | 99.68 | 99.15 | 9.98 | 1 cw_invert_e_hn | 9c NOT | |
| xxxxyyyzzz_result_rq_q(62) | | | | | | | | | | |
| --> xxxxxx_yyyyyy_zzzzz_rq_q_1i(62)/yR | M@L | 7.94 | 9.87w | -0.88 | 99.33 | 99.49 | 9.97 | 1 cw_invert_e_hn | 9c NOT | xyz_result(62) |
| --> xxxxxx_yyyyyy_zzzzz_result_1i(62)/a | R M@L | 8.81 | 9.80 | -0.88 | 99.46 | 99.49 | 9.97 | 1 cw_invert_e_hn | 9c NOT | xyz_result(62) |
| --> xxxxxx_yyyyyy_zzzzz_result_1i(62)/y | F M@L | 9.62 | 9.56w | -0.88 | 99.65 | 99.78 | 9.58 | 1 cw_invert_e_hn | 9c NOT | xyz_result_1i(62) |
| --> xxxxxx_yyyyyy_zzzzz_result_2i(62)/a | F M@L | 10.17 | 9.23 | -0.88 | 99.40 | 99.78 | 9.58 | 1 cw_invert_e_hn | 9c NOT | xyz_result_1i(62) |
| --> xxxxxx_yyyyyy_zzzzz_result_2i(62)/y | R M@L | 11.40 | 9.33w | -0.88 | 99.09 | 99.07 | 9.33 | 2 cw_invert_e_hn | 9c NOT | xyz_result_2(62) |
| --> xxxxxx_yyyyyy_zzzzz_result_3i(62)/a | R M@L | 12.73 | 9.04 | -0.88 | 99.16 | 99.07 | 9.33 | 2 cw_invert_e_hn | 9c NOT | xyz_result_2(62) |
| --> xxxxxx_yyyyyy_zzzzz_result_3i(62)/y | F M@L | 13.78 | 9.20w | -0.88 | 99.76 | 99.82 | 9.58 | 1 cw_invert_e_hn | 9c NOT | xyz_result_3i(62) |
| --> xxxxxx_yyyyyy_zzzzz_result_4i(62)/a | F M@L | 14.97 | 9.43 | -0.88 | 99.23 | 99.82 | 9.58 | 1 cw_invert_e_hn | 9c NOT | xyz_result_3i(62) |
| --> xxxxxx_yyyyyy_zzzzz_result_4i(62)/y | R M@L | 15.41 | 9.03w | -0.88 | 99.23 | 99.74 | 9.55 | 2 cw_invert_e_hn | 9c NOT | xyz_result_4(62) |
| --> xxxxxx_yyyyyy_zzzzz_result_3i(62)/a | R M@L | 16.43 | 9.59 | -0.88 | 99.13 | 99.74 | 9.55 | 2 cw_invert_e_hn | 9c NOT | xyz_result_4(62)0.13 |
| adjust | | | | | | | | | | |
| --> xxxxxx_yyyyyy_zzzzz_result_3i(62)/y | F M@L | 17.15 | 9.85w | -0.88 | 99.08 | 99.26 | 9.97 | 1 cw_invert_e_hn | 9c NOT | xyz_result_4i(62)1.07 |
| --> xxxxxx_yyyyyy_zzzzz_result_5i(62)/a | F M@L | 18.07 | 9.21 | -0.88 | 99.27 | 99.26 | 9.97 | 1 cw_invert_e_hn | 9c NOT | xyz_result_4i(62)0.22 |
| adjust | | | | | | | | | | |
| --> xxxxxx_yyyyyy_zzzzz_result_5i(62)/y | R M@L | 19.50 | 9.68w | -0.88 | 99.19 | 99.69 | 9.64 | 3 cw_invert_e_hn | 9c NOT | xyz_result_18i(62)0.51 |
| adjust | | | | | | | | | | |
| --> xxxxxx_yyyyyy_zzzzz_result_21i(62)/a | R M@L | 20.69 | 9.21 | -0.88 | 99.36 | 99.69 | 9.64 | 3 cw_invert_e_hn | 9c NOT | xyz_result_18i(62)0.29 |
| adjust | | | | | | | | | | |
| --> xxxxxx_yyyyyy_zzzzz_result_21i(62)/y | F M@L | 21.19 | 9.50w | -0.88 | 99.26 | 99.05 | 9.58 | 1 cw_invert_e_hn | 9c NOT | |
| xyz_result_21i_n36259(62)0.75 adjust | | | | | | | | | | |
| --> xxxxxx_yyyyyy_zzzzz_result_22(62)/a | F M@L | 22.44 | 9.69 | -0.88 | 99.33 | 99.05 | 9.58 | 1 cw_invert_e_hn | 9c NOT | |
| xyz_result_21i_n36259(62) | | | | | | | | | | |
| --> xxxxxx_yyyyyy_zzzzz_result_22(62)/y | R M@L | 23.14 | 9.70w | -0.88 | 99.59 | 99.92 | 9.85 | 3 cw_invert_e_hn | 9c NOT | |
| xyz_result_22_n36260(62)0.22 adjust | | | | | | | | | | |

FIG. 13

DETECTING CIRCUIT DESIGN FLAWS BASED ON TIMING ANALYSIS

BACKGROUND

One or more aspects of the invention relate generally to analyzing design problems of electronic chips, and in particular, to analyzing an end point report for a design of an electronic circuit.

Advancing semiconductor manufacturing technology allows squeezing more and more functionality, and thus, transistors on a single semiconductor chip. By increasing the complexity within a chip design, dependencies between different functional points, size and placement of individual devices, as well as physical/geometrical paths between logically dependent functions also increase. Additionally, the operational speed is ever increasing using higher and higher clock rates. Timing issues arise even when using synthesis tools for selected functions because these synthesis tools may not be perfect. That is, several timing problems remain in synthesized circuits. Thus, a manual analysis and repair of the circuit design may be required. One solution to address this problem is a usage of endpoint reports as a result of an automatic analysis of a designed circuit. Such endpoint reports look for critical signal paths in the design but which do not directly reveal what circuit design flaws need to be improved. In order to find these circuit design flaws in an endpoint report, a series of manual steps are currently required to be performed by a system designer. The system designer needs to bring in his/her experience and time to find the circuit design flaws.

SUMMARY

In one aspect, a computer-implemented method of analyzing an end point report for a design of an electronic circuit is provided. The computer-implemented method includes loading, in a processing device, results of a static timing analysis run; selecting, by the processing device, a path from said loaded results; providing technology specific context data; determining, by the processing device, for one or more test points of the selected path, design quality parameters for determining a design problem area; and determining, for the design problem area, a root cause by analyzing design problem area data in comparison to related ones of said technology specific context data.

As a further aspect, a computer system for analyzing an end point report for a design of an electronic circuit is provided. The computer system includes a memory; and a processing device in communication with the memory, wherein the computer system is configured to perform a method. The method includes loading results of a static timing analysis run; selecting a path from said loaded results; providing technology specific context data; determining, by the processing device, for one or more test points of the selected path, design quality parameters for determining a design problem area; and determining, for the design problem area, a root cause by analyzing design problem area data in comparison to related ones of said technology specific context data.

In yet another aspect, a computer program product for analyzing an end point report for a design of an electronic circuit is provided. The computer program product includes a computer readable storage medium readable by a processing circuit and storing instructions for execution by the processing circuit for performing a method. The method includes loading results of a static timing analysis run; selecting a path from said loaded results; providing technology specific context data; determining, by the processing device, for one or more test points of the selected path, design quality parameters for determining a design problem area; and determining, for the design problem area, a root cause by analyzing design problem area data in comparison to related ones of said technology specific context data.

BRIEF DESCRIPTION OF THE DRAWINGS

Aspects of the present invention are apparent from the examples of embodiments to be described hereinafter and are explained with reference to the examples of embodiments, but to which the invention is not limited.

Embodiments of the invention will be described, by way of example only, and with reference to the following drawings:

FIG. 13 illustrates a typical end point report, in accordance with an aspect of the present invention.

DETAILED DESCRIPTION

Figure 1:
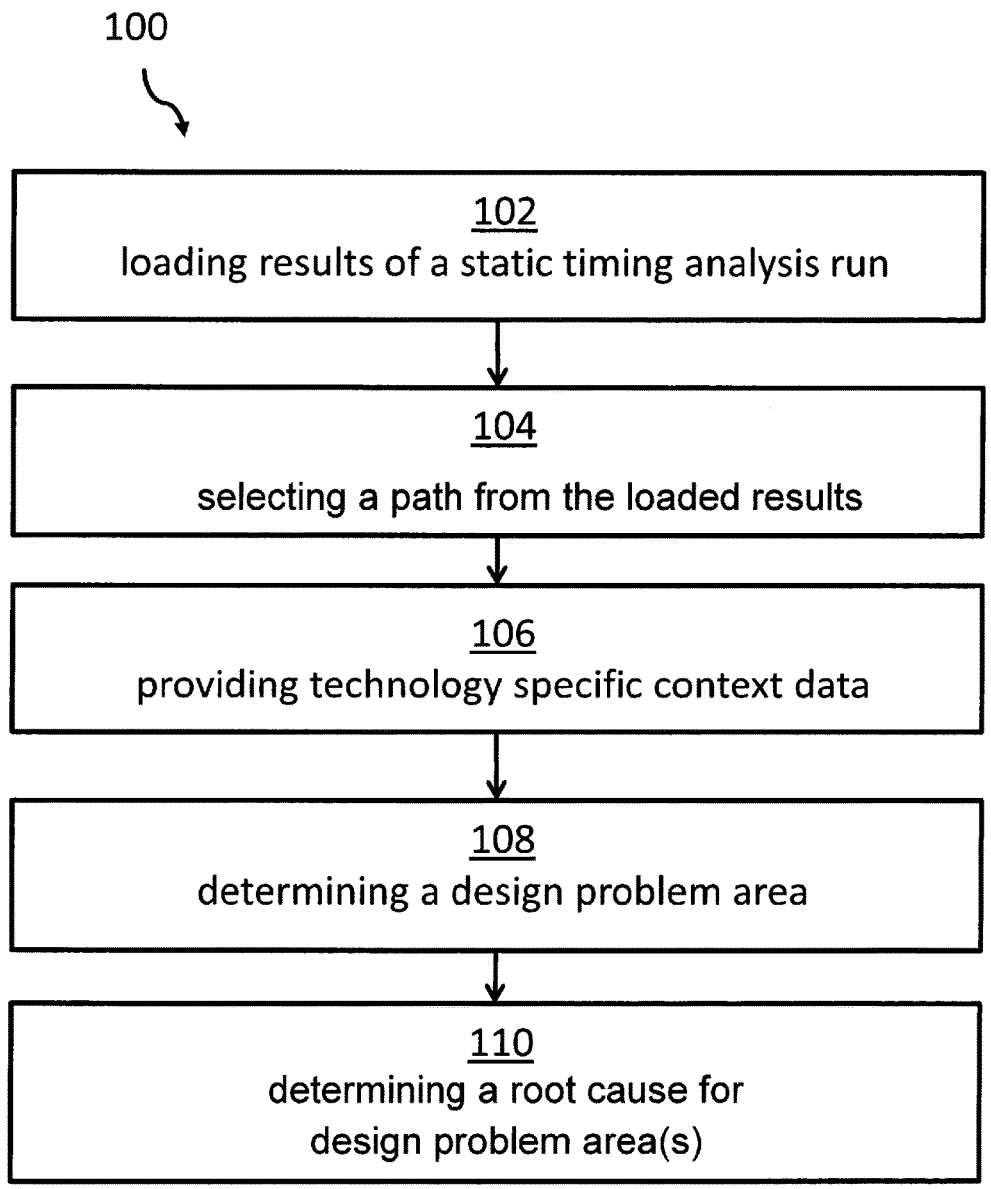
FIG. 1 shows an embodiment of a method for analyzing an end point report for a design of an electronic circuit, in accordance with an aspect of the present invention.

In the context of this description, the following conventions, terms and/or expressions may be used:

The term 'circuit design flaw' may denote deficiencies in a design of an electronic chip. The electronic circuit of the chip may be unstable, not fast enough or may produce inconsistent output signals. In general, an optimization of devices, connection and signal flows may be achieved by a detailed analysis of the circuit design and chip design to overcome circuit design flaws.

The term 'electronic circuit' may denote an integrated semiconductor circuit of electronic and electric components commonly referred to as an electronic chip. Such a chip may be manufactured using different technology processes like a bipolar process or a CMOS process with different numbers of steps relating to different layers of the semiconductor chip. Individual devices of the electronic circuit may be linked to each other via on-chip wires. The electronic circuits may also be designed as three-dimensional chips being connected to each other through vias. Many millions of different devices may be integrated into a semiconductor-based electronic circuit.

The term 'end point report' may denote a list of timing critical paths through the circuit, each one being a path between an input and an output with the maximum delay. The end point report may be one of the results of a static timing analysis.

An end point report may be a list of textual tables of different simulation calculations comprising a lot of difficult to interpret abbreviations and acronyms. A possible example of an end point report path is shown as FIG. 13. This may be hard to read and interpret. Typical values given are data values for clock phase, arrival time, total capacity, sink capacity, drain capacity, gate capacity, fan out, or delay.

The term 'static timing analysis run' may denote a simulation method to compute the expected timing of a digital circuit without requiring a full simulation of the circuit. Static timing analysis may provide a fast and reasonably accurate measurement of circuit timing. It may provide a list of timing critical paths through the circuit.

The term 'path' may denote a route through an electronic circuit. Electric signals may travel along such a path. The signals may be delayed by individual devices—including wires between the devices—when traveling along such a path. The delays may, e.g., be characteristic values of the related devices and or wire laying or characteristics. A path may be denoted as "critical" if the signals progressing along such a critical path determine a general chip behavior, e.g., the overall processing speed of the chip.

The term 'technology specific context data' may denote characteristic values for specific device type manufacturers using a specific manufacturing technology. Typical devices using one manufacturing technology may cause different signal delays if compared to equivalent devices manufactured using another manufacturing technology, i.e., another production process.

The term 'test point' may denote an element regarding a row in a critical path computed by static timing analysis. Each test point may correspond to a device pin in an electronic circuit, which may be traversed by the critical path. Each test point may describe specific parameters for this device pin, like its name, connected net name, arrival time, slew, capacitances, delays, etc. The relevant parameters in the context of this document are called 'design quality parameters' throughout this document.

The term 'design quality parameters' may denote different numeric values designed to differentiate a good design compared to a bad design of an electronic chip layout. A good design may, e.g., cause only little delays in comparison to high delays in bad designs or chip layouts. The same may apply to signal slews and/or placements of devices or wirings as part of the electronic chip. It may be understood that a placement relates to a geometric position within the chip layout.

The term 'design problem area' may denote a group of devices, test points and/or wirings causing, e.g., signal delays or, other physical effects influencing the functionality of an electronic chip in a negative way. A design problem area may relate to only one device or even one single feature of a device or the way different devices are linked to each other and/or interact with each other. A design problem area may typically be related to a test point. However, also more than one design problem area may relate to one test point. Additionally, a design problem area may also relate to different test points.

The term 'root cause' may denote a fundamental ground for a design problem area. The real cause may also be understood as a relative "problem importance". By identifying a root cause—or identifying a problem importance—for a given design problem area, the functional design problem may be addressed by a different design of the electronic chip. Thus, the design problem area may be eliminated resulting in high-quality electronic chips.

The term 'design problem area data' may denote data and/or measurement values relating to a design problem area. This may enable a comparison of different design problem areas. The data may also be used for a further analysis process to optimize the chip design.

The term 'phase' may denote a timing phase corresponding to a clocking scheme applied when computing the static timing analysis. Some circuits may support multiple clocking schemes, like, e.g., scannable latches that both support a normal data clocking but also a scan clocking for circuit initialization and debugging. When performing static timing analysis for a circuit that supports multiple clocking schemes, simulation may have to be performed for each clocking scheme separately and the clocking scheme may be denoted as phase in the end point report.

The term 'placement' may denote a geometrical position of a device or any other component of the electronic circuit of the chip relative to an edge or corner of the chip. Based on such placement data, distances in an x- and/or y-direction between different devices may be calculated.

The term 'adjust' may denote a timing adjustment performed during static timing analysis due to external conditions like noise and capacitive coupling between different nets. The additional delay introduced by this coupling may be added as an adjust test point to the critical path.

The term 'assertion' may denote the contract applied to the primary input and output pins of a circuit during static timing analysis. It may mainly comprise an asserted arrival time and slew for input pins, and the required arrival time and capacitive load for output pins.

A proposed method for analyzing an end point report for a design of an electronic circuit may offer a couple of advantages:

Although end point reports of a circuit design analysis are available, they are typically delivered in a listing form which is not easy to interpret, requires a lot of experience of the circuit designer, and requires a certain amount of time for the circuit designer to identify circuit design flaws and how to address, i.e., repair them.

One or more aspects of the method and related system described herein improve the tool support for identifying circuit design flaws and in addition give recommendations of how to improve the circuit design in order to meet predefined design criteria. Thus, average circuit designers, not having many years of experience in enhancing existing circuit designs by addressing timing issues on critical paths, may be able to improve circuit designs by using the recommendations generated by one or more of the aspects provided herein.

One or more aspects may use most of the available information about the actual design as well as technology specific context data that is generally available and put it into context of a specific circuit design. For each test point, a series of analysis is performed automatically based on known parameters of implemented devices, placement of devices as part of the physical layout of the circuit in comparison to a critical path, as well as specific device pins, wire delays, adjusts, device delays (like inverter, NAND, NOR, or buffer), assertions, slews, just to name a few. For this, all known device and placement data are used, and expected delays, etc. may be tested against typical threshold values (warning and/or error threshold values).

Thus, a complete behavior of devices and wires as part of critical paths may be analyzed automatically. Design problem areas may be identified and may be highlighted in a graphically enhanced way and recommendations may be given to the circuit designer to improve chip design work. This may improve the speed in which circuit design flaws may be detected and corrected. Thus, the design process may be shorter and the quality and functionality of the designed circuit may be improved.

An example may demonstrate achieved effects: an inverter has a typical delay of 4 to 6 ps (pico seconds) when properly used. If the delay of the inverter is comparably high, this may be caused by:

an inverter input pin slew that is too high; in this case, a better wiring in front of the inverter may be recommended;
the inverter transistors have a high threshold voltage; in this case, using faster transistors may be recommended;
the inverter may have a too high of a capacity to load on its output; if the inverter output fan is too high, it may be recommended cloning the inverter (or other components in front of it) and that may distribute the fan out in the resulting circuit—if the load is too high but the fan out is low, it may be recommended using a better wire quality after the inverter or reduce the wire length.

This way, the designer automatically obtains a set of recommendations to improve the circuit without personally intensively analyzing details of an available end point path. The findings and resulting recommendations may be displayed in an augmented representation as part of an enhanced end point path report and/or in addition in the form of textually expressed recommendations.

FIG. 1 shows an embodiment 100 of a method for analyzing an endpoint report for a design of an electronic circuit, in accordance with an aspect of the present invention. The method comprises loading, 102, results of a static timing analysis run; selecting a path, 104, from the loaded results; and providing, 106, technology specific context data. Additionally, the method comprises determining, 108, for one or more (e.g., every) test point of the selected path, design quality parameters for determining a design problem area; and determining, 110, for one or more (e.g., every) design problem area, a root cause by analyzing design problem area; data in comparison to related ones of the technology specific context data. It may be noted that the mentioned root cause may also be interpreted as a problem severance in the end point report.

According to one embodiment of the method, the technology specific context data may comprise at least one out of the group comprising a threshold value—e.g., a misplacement of error distance threshold value, a critical wire delay threshold, a device output slew, etc.—a typical delay value or, a maximum slew value for each phase. Technology specific context data may thus relate to a context of the used underlying manufacturing or production technology process of the electronic circuit. This may, e.g., relate to the semiconductor material used, manufacturing process boundaries of the resulting electronic chip or other environmental parameters in the context of the semiconductor circuit manufacturing process.

According to one embodiment of the method, the design quality parameter may comprise at least one out of the group comprising a comparably high delay, in particular if compared with an expected average delay, a signal slew, and/or a placement of a device within a layout of the electronic circuit. The placement of the device may describe a geographical position of a device within a chip or circuit layout in terms of coordinates relative to, e.g., a corner of a circuit.

According to another embodiment of the method, a color rendering attribute and/or test point design quality parameter may be assigned to a test point relating to a design problem area. This way, a designer may obtain high quality advice to address design flaws which even an unexperienced circuit designer may use without in-depth analysis of the end point report and years of experience.

According to another embodiment of the method, the test point may be selected out of the group comprising a pin, a wire delay, an adjust, a device delay, and an assertion. This way, different basic categories of root causes may be addressed. These may be analyzed in more detail.

According to a further embodiment of the method and in the case the design quality parameter is a placement, the method may comprise determining a last or penultimate test point position, determining a placement delta of a current test point in relation to the last or penultimate test point position, loading a global path direction vector, determining whether the placement delta is following the global path direction vector, determining whether the placement delta is above an ignore placement mismatch threshold; and determining whether the placement delta is above a critical placement mismatch threshold. These steps of the method may ensure that comparable short wire lengths are used and that components actually belonging functionally together may be placed in close proximity to each other.

In accordance with a further embodiment and in the case the test point is of a type wire delay, the method may comprise determining a source pin load and a related sink pin slew. This way detailed information may be generated about specific wires connecting devices of the electronic chip.

In accordance with a further embodiment and in the case the test point is of a type device delay, the method may comprise analyzing a device, a buffer, and/or a latch. The device itself may cause a high delay. Also in the case the device may be a buffer or a latch, these devices may undergo device-specific tests.

According to another embodiment of the method, the analyzing the device may comprise determining at least one out of the group comprising a device voltage threshold, a device primary output slew, a device primary output load in comparison to a device size, and a device fan out value. These parameters of the device have proven to be, e.g., critical in the sense of design flaws. A further investigation may be required.

If, according to an embodiment of the method, the device analyzed may be a buffer, the method may comprise determining a warning threshold value and an error threshold for a primary input slew of a buffer, and in the case the buffer primary input slew may be better than a primary output slew of the buffer, an obsolete buffer error message may be reported, and in the case the buffer primary input slew may be better than an error threshold, an obsolete buffer error message may be reported. This way, different levels of design flaws may be detected and different recommendations may be given to a designer.

If, according to an additional embodiment of the method, the device analyzed may be a latch, the analyzing the device may comprise identifying a latch type, and loading a local clock wire delay, a slew, and a fan out from a previous test point in the selected path. These may be compared to gain a deeper understanding of circuit design deficiencies.

Figure 2:
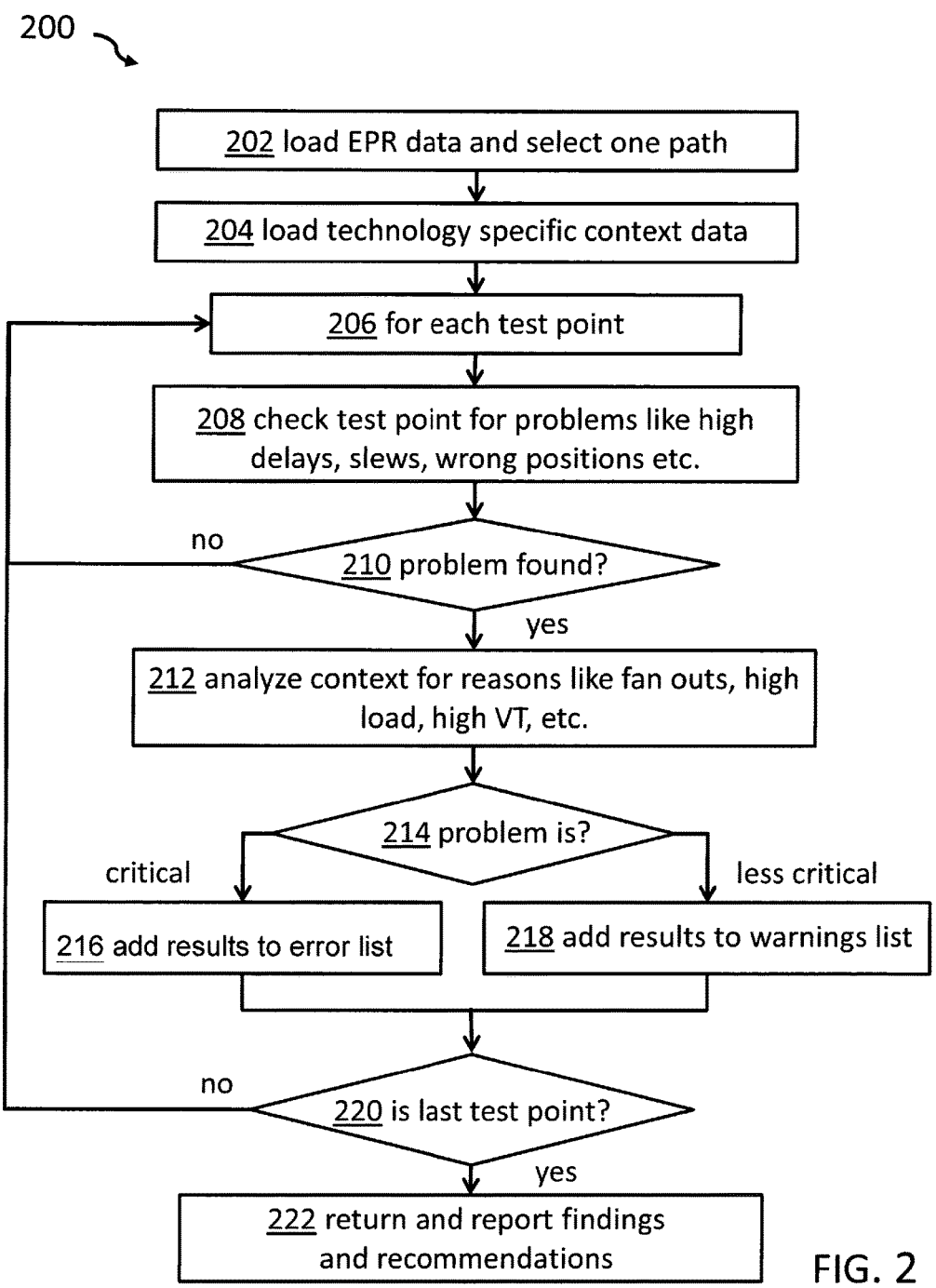
FIG. 2 shows one example of a more detailed flowchart of analyzing the end point report, in accordance with an aspect of the present invention.

FIG. 2 shows a more detailed flowchart 200 of analyzing the endpoint report. The process starts with loading, 202, endpoint report (EPR) data into a method related analysis tool and selecting a path, e.g., a critical path. Next, technology specific context data may also be loaded, 204. Then a loop process, starting at block 206 and ending at block 220, is performed. A test point may be checked, 208, for problems regarding high delays, slews, wrong positions and so on (this will be detailed below), as examples. If the problem may be found, 210, case "yes", a context for reasons, like fan outs, high load, high voltage threshold (VT) and so on (detailed below) may be analyzed, 212. If it is determined, 214, that the problem is critical, the results are added to an error list, 216. If it is determined, 214, that the problem is less critical, the results are added to a warnings list, 218.

If no problems found (compare determination point 210) or if the last test point has not been reached, 220, the process returns back to the beginning of the loop, 206. Otherwise, the findings and recommendations are reported and, e.g., displayed in a graphical form to a user, 222.

Figure 3:
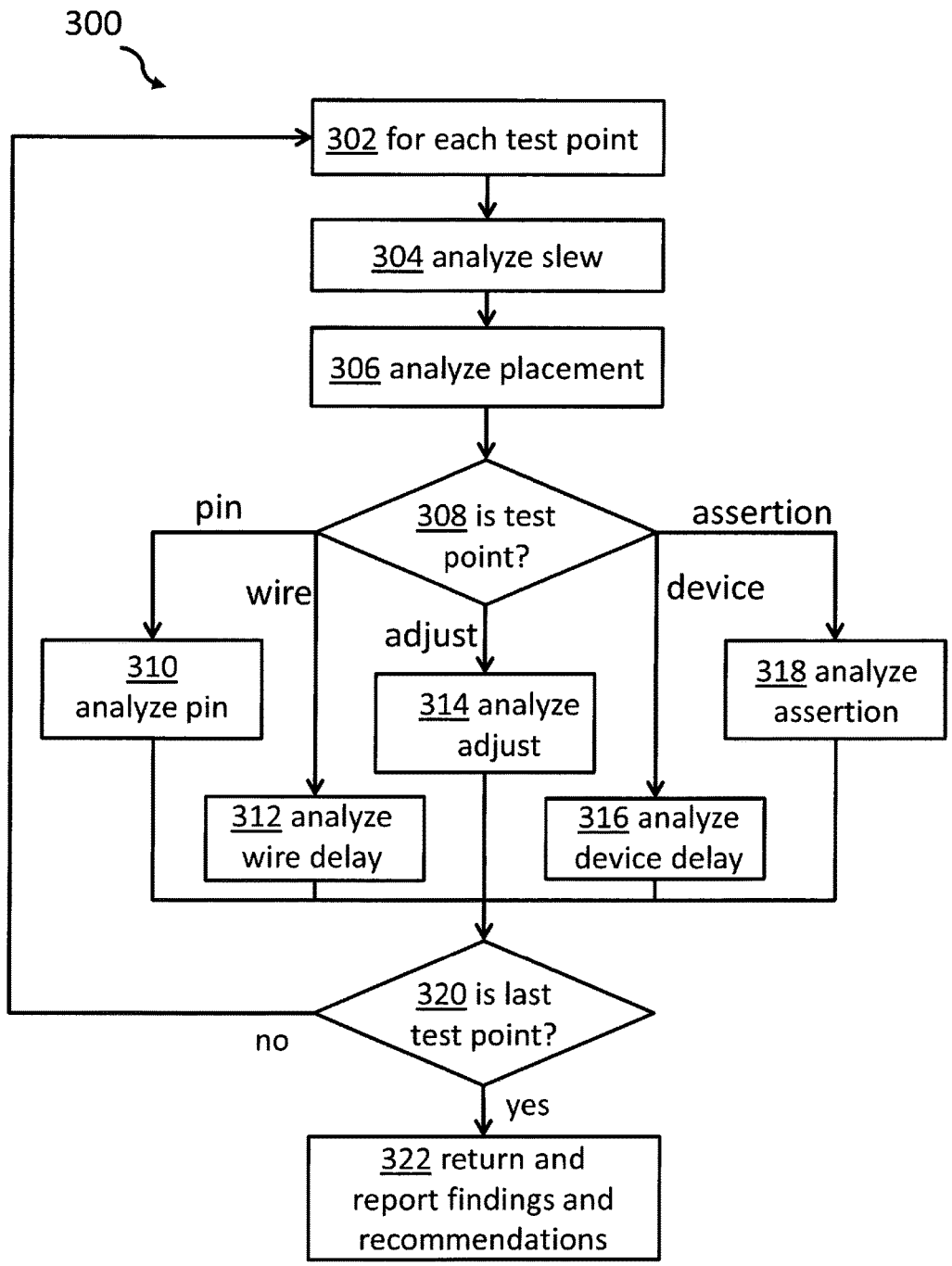
FIG. 3 shows one example of a flowchart of how to analyze test points of an end point report, in accordance with an aspect of the present invention.

FIG. 3 shows one example of a flowchart 300 of how to analyze test points of an end point report. For each test point, 302, a slew is analyzed, 304, and a placement of a device is analyzed, 306. It may be determined, 308, what characteristic the test point may have. The test point may be a pin of a device, a wire, an adjust, a device, or an assertion, as examples. In each of the cases, a specific analysis may be performed; namely, an analyze pin procedure 310, an analyze wire delay procedure 312, an analyze adjust procedure 314, an analyze device delay procedure 316, and an analyze assertion procedure 318. In case not all test points have been analyzed, 320, the process returns back to the beginning, 302. Otherwise, the findings and recommendations may be returned and reported, 322.

For special pins, like macro or unit primary output pins (PO), a load check may be performed. If the PO load value exceeds the related threshold value, an error or warning may be reported that recommends reducing the PO load in order to avoid electro-migration issues. The threshold values may be different for macros and units, since units may drive higher loads due to larger buffers.

When the unit timing context is available, an additional check may be performed for macro input and output pins. The unit integration report is parsed together with the unit timing data and may contain information about macro pins that are not optimally placed and cause superfluous wire delay (this excessive delay may be called "credit"). The method may search for the macro pins of the test point in this report. If found, it may extract the pin credit values and compare them against the error and warning threshold values. If the pin credit value is higher than the threshold value, it highlights the pin in the report and generates a text message that recommends moving the pin and indicates the potential of timing improvement that may be achieved by the move.

For instance, for each macro (or unit) input and output pin, the assertions are compared for excessive differences. When timing data is loaded, the assertions used to build the macro, as well as those newly generated by the unit timing run (to be used in a next macro build iteration), are loaded as well. The method compares the arrival time and output pin load values on these assertions. If the differences exceed the threshold, a warning or error is reported, recommending refreshing the assertions for the next macro build iteration. In addition, the asserted PO load value is checked against threshold values. If it exceeds the threshold, an error or warning is written that recommends reducing the PO load in order to avoid electro migration issues. The thresholds are different for macros and units, since units can drive higher loads due to larger buffers.

For each adjust test point, a check may be performed to verify whether the adjust value is above the warning or error threshold. Such errors and warnings may be highlighted and reported together with the recommendation to modify the wire in order to reduce the coupling. In addition, all adjust values may be accumulated and the sum may be compared against warning and error thresholds for the overall adjusts in the path. In case the adjust sum may exceed the thresholds, an overall warning or error for the wire quality of this path may be reported.

Figure 4:
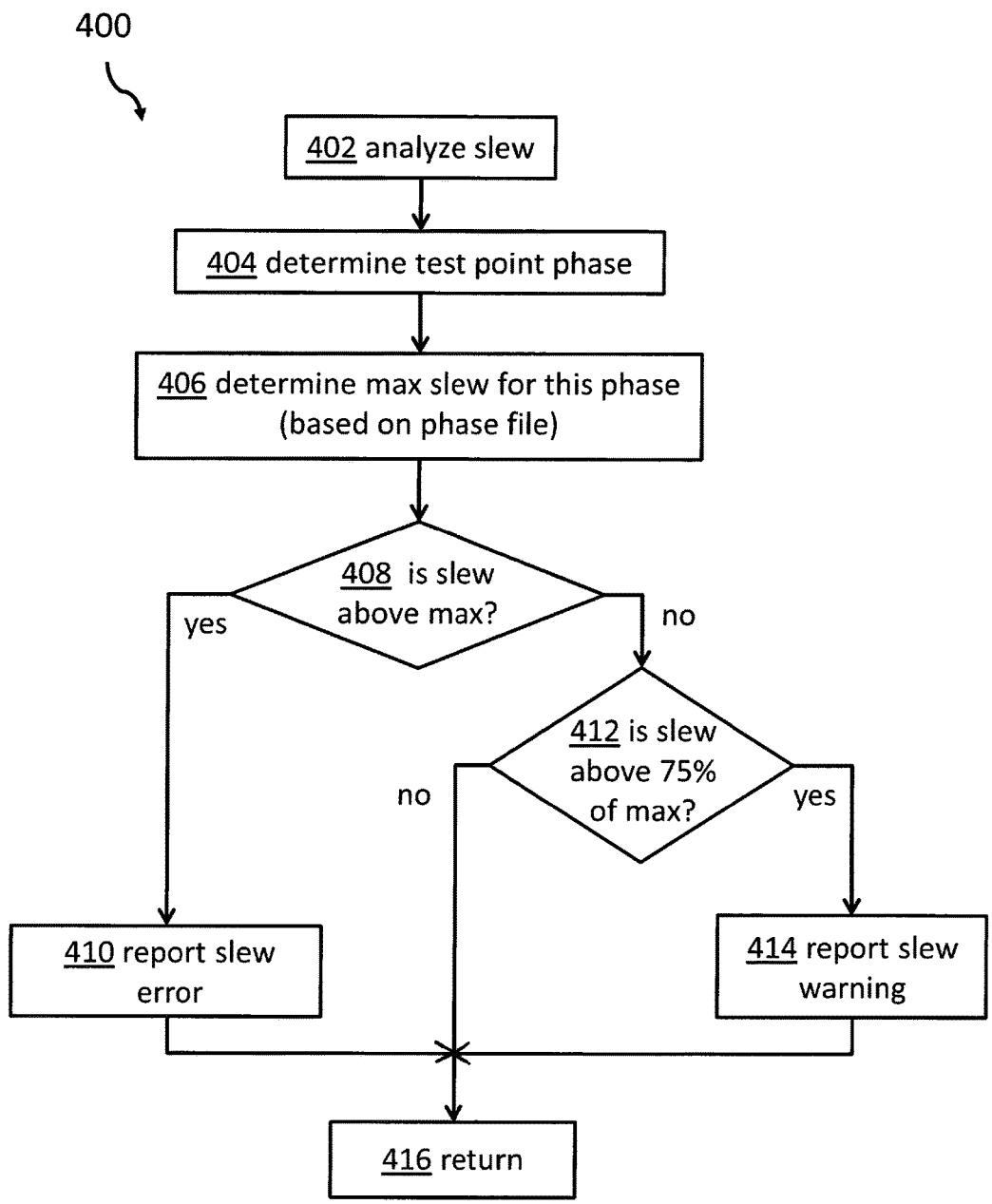
FIG. 4 shows one example of a flowchart of how to analyze slew, in accordance with an aspect of the present invention.

FIG. 4 shows one example of a flowchart 400 of how to analyze slew. The process may start at a first block 402. A test point phase may be determined, 404. A maximum slew for this phase—based on a phase file (not shown)—may be determined, 406. If the slew is above a maximum value, 408, a slew error is reported, 410, and the process may end at block 416. In case the slew is not above a maximum value, 408, it may be determined, 412, whether the slew is above a value of, e.g., 75% of a maximum slew value. If that is the case, a slew warning may be reported, 414 and the process may end, 416. If the slew is not above the mentioned 75% of a maximum slew value, the process may also end at 416.

Figures 5A, 5B:
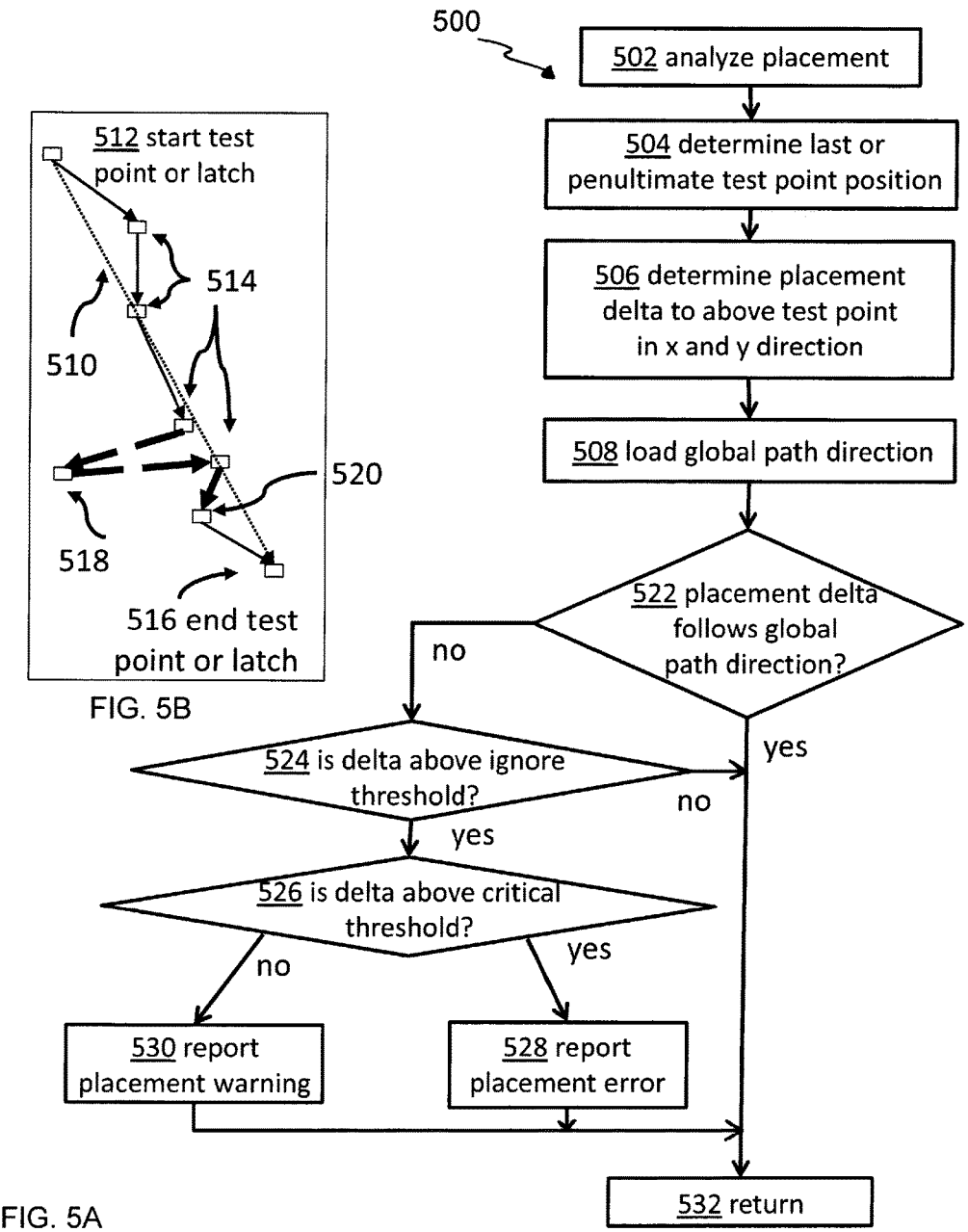
FIG. 5A shows one example of a flowchart of how to analyze a placement of devices, in accordance with an aspect of the present invention.
FIG. 5B depicts one example of a global path direction, in accordance with an aspect of the present invention.

FIG. 5A shows one example of a flowchart 500 of how to analyze a placement of devices, 502. Firstly, a last or penultimate test point position may be determined, 504. A placement delta of a current placement to the last test point with a defined position/placement may be determined in an x and a y direction, 506. Then, a global path direction may be loaded, 508. This global path direction may also be shown by reference numeral 510 (FIG. 5B) as a dashed, straight line from a start test point or latch 512 to an end test point or latch 516. The global path direction may start at a start test point 512 and may end at an end test point or latch 516. In between, other test points 514 may be placed generally along the global path direction 510. However, test point 518 may be out of line with the global path direction 510. Consequently, a placement error may be determined, 528 (FIG. 5A). In another case, a test point 520 (FIG. 5B) may not lie as far away as test point 518. In this case, a placement warning may be reported, 530 (FIG. 5A).

This may also be seen from the flowchart 500. At block 522, it may be determined whether the placement delta's (in x and y directions) follow the global path direction. In case of "no", it may be determined, 524, whether the delta is above an ignore threshold value. In case of "yes", it may be determined, 526, whether the delta is above a critical threshold value. In case of "yes", a placement error may be reported, 528. In case of "no" of the determination performed in block 526, a placement warning may be reported, 530.

The process ends, 532, upon four conditions: either the placement delta follows the global path direction, in case of "yes" of determination block 522, or in case of "no", the delta is not above an ignore threshold value (compare 524), or a placement warning 530 or a placement error 528 has been reported.

Figure 6:
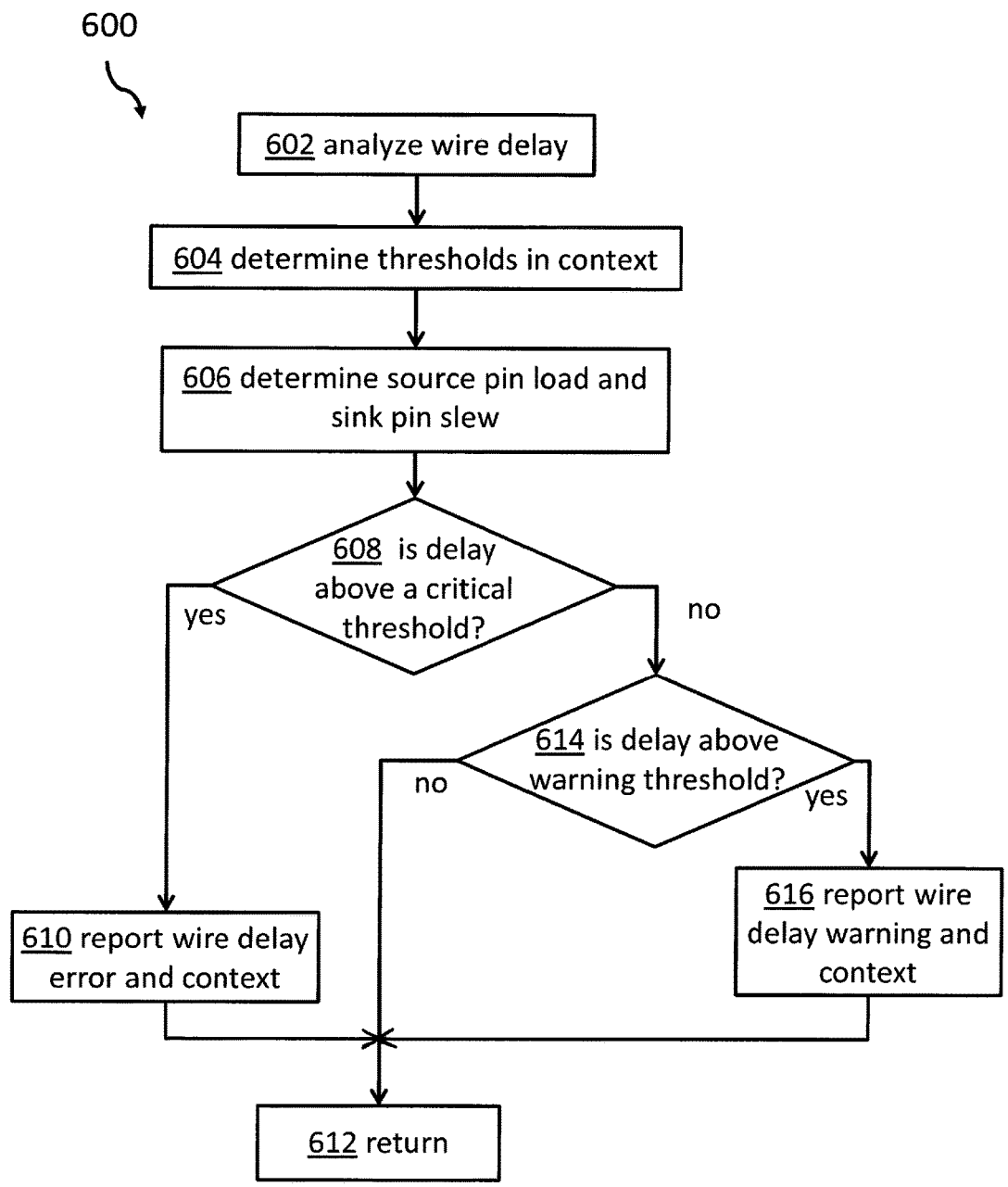
FIG. 6 shows one example of a flowchart of how to analyze wire delays, in accordance with an aspect of the present invention.

FIG. 6 shows one example of a flowchart 600 of how to analyze wire delays, 602. Firstly, threshold values are determined in the context of the circuit design (macro or unit wire), 604. Then, a source pin load and a sink pin slew may be determined, 606. Next, it may be determined, 608, whether the delay is above a critical threshold value. In case of "yes", a wire delay error and a related context may be reported, 610, before the process ends, 612. In case of "no", it may be determined, 614, whether the delay is above of a warning threshold value. In case of "no", the process ends, 612. In case of "yes", a wire delay warning and a related context may be reported, 616.

Figure 7:
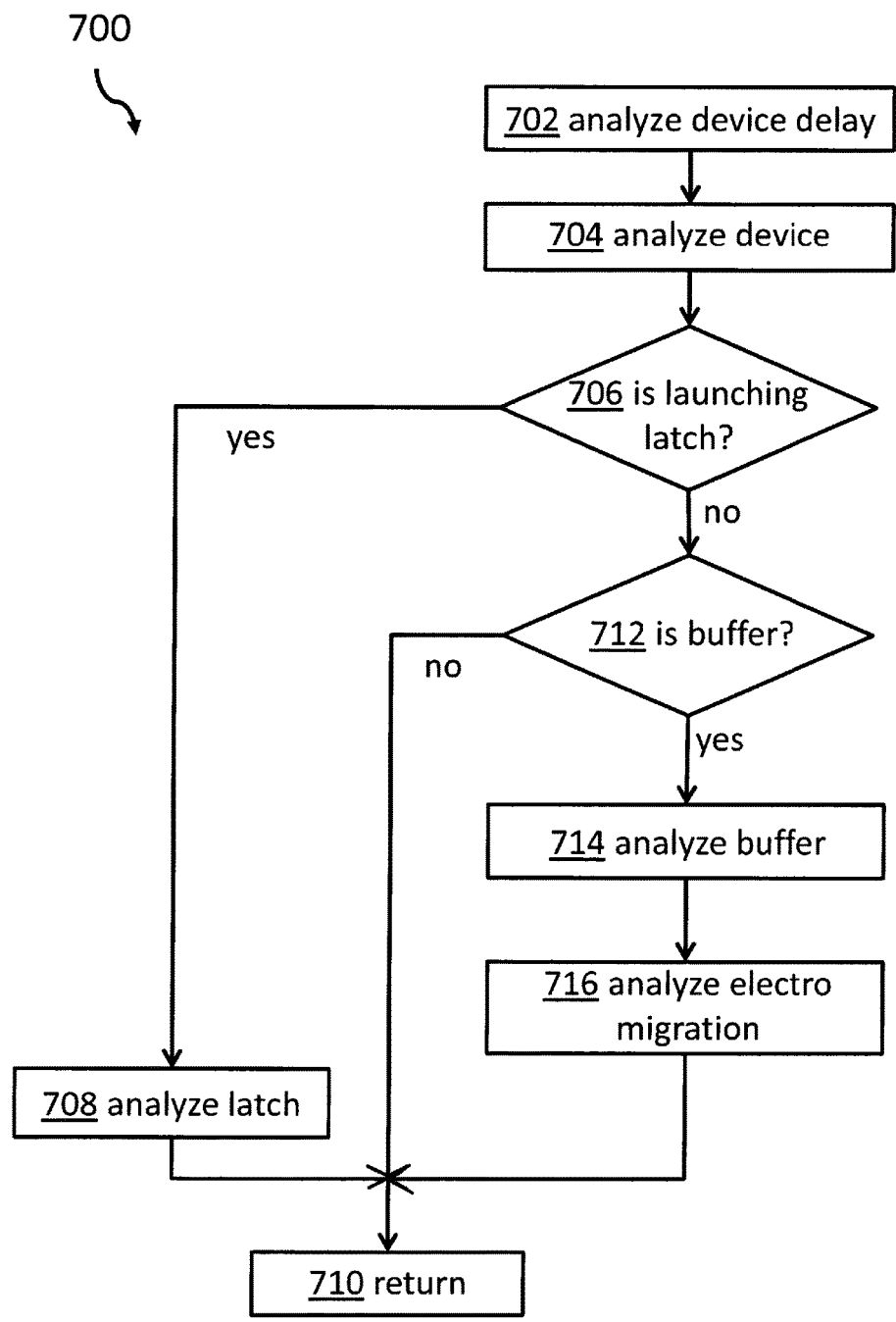
FIG. 7 shows one example of a flowchart of how to analyze device delays, in accordance with an aspect of the present invention.

FIG. 7 shows one example of a flowchart 700 of how to analyze a device delay, 702. The device may be analyzed, 704 (detailed below). If the device is a launching latch, 706, the latch may be analyzed, 708, and the process may end, 710. In case it is not a launching latch, it may be determined, 712, whether the device is a buffer. In case of "no", the process may end, 710. In case of "yes", the buffer may be analyzed, 714 (detailed below). The buffer output pin capacitive load may also be determined, 716, before the process ends 710. In the case the load exceeds a warning or error threshold, this may be reported with the recommendation to reduce the wire load at output in order to avoid electro migration issues.

Figure 8:
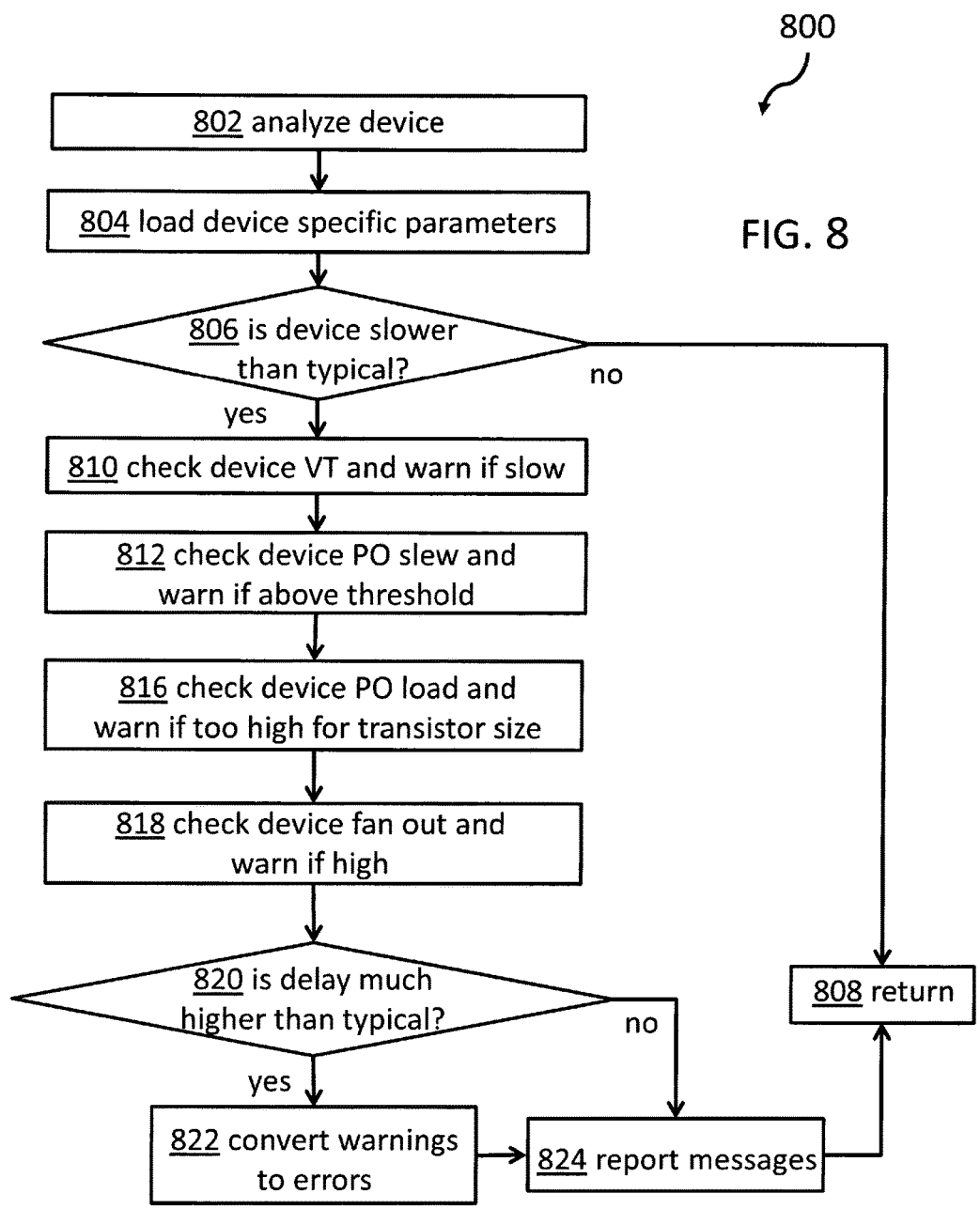
FIG. 8 shows one example of a flowchart of how to analyze a device, in accordance with an aspect of the present invention.

FIG. 8 shows one example of a flowchart 800 of how to analyze a device, 802. Firstly, device specific parameters are loaded, 804. Then, it may be determined, 806, whether the device is slower than a typical value. In case of "no", the process ends, 808. In case of "yes", a device voltage threshold (VT) is checked, 810 and a warning may be generated if the voltage threshold is high, and thus, the device is too slow. Next, a device pin out (PO) slew may be checked, 812 and a warning may be generated if the value may be above a predefined threshold. Next, 816, a device output pin load may be checked and a warning may be generated if the load may be too high for the given transistor size of the device. If in block 818 it is determined that a device fan out value is too high, a warning may be generated. Then, it may be determined, 820, whether the device delay may be much higher than a typical value. In case of "yes", the warnings may be converted, 822, to errors, the messages may be reported, 824, and the process may end, 808. Otherwise, in case of "no", the messages may only be reported as warnings, 824, before the process ends, 808.

Figure 9:
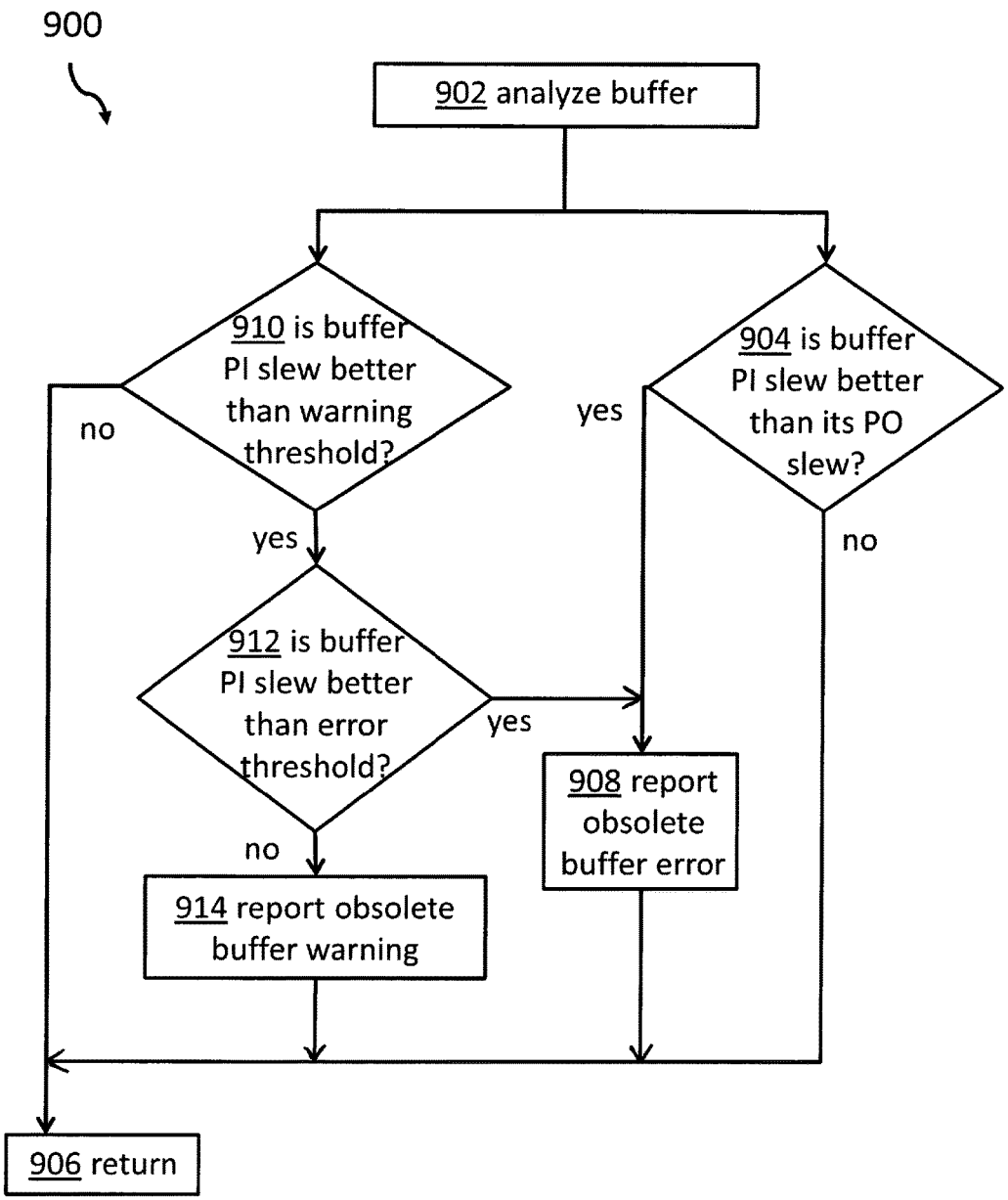
FIG. 9 shows one example of a flowchart of how to analyze a buffer, in accordance with an aspect of the present invention.

FIG. 9 shows one example of a flowchart 900 of how to analyze a buffer, 902. Two sorts of determinations may be performed: firstly, it may be determined, 904, whether a buffer primary input (PI) slew is better than its primary output (PO) slew. In case of "no", this process may end, 906. In case of "yes", an obsolete buffer error may be reported, 908, after which the process ends, 906. Secondly, it may be determined, 910, whether the buffer primary input slew value is better than a warning threshold value. In case of "no", the process may end, 906. In case of "yes", it may be determined, 912, whether the buffer primary input slew value is better than a related error threshold value. In case of "yes", an obsolete buffer error may be reported, 908, before the process ends, 906. In case of "no" of the last determination (buffer primary input slew better than error threshold), an obsolete buffer warning may be reported, 914, before the process ends, 906.

Figure 10:
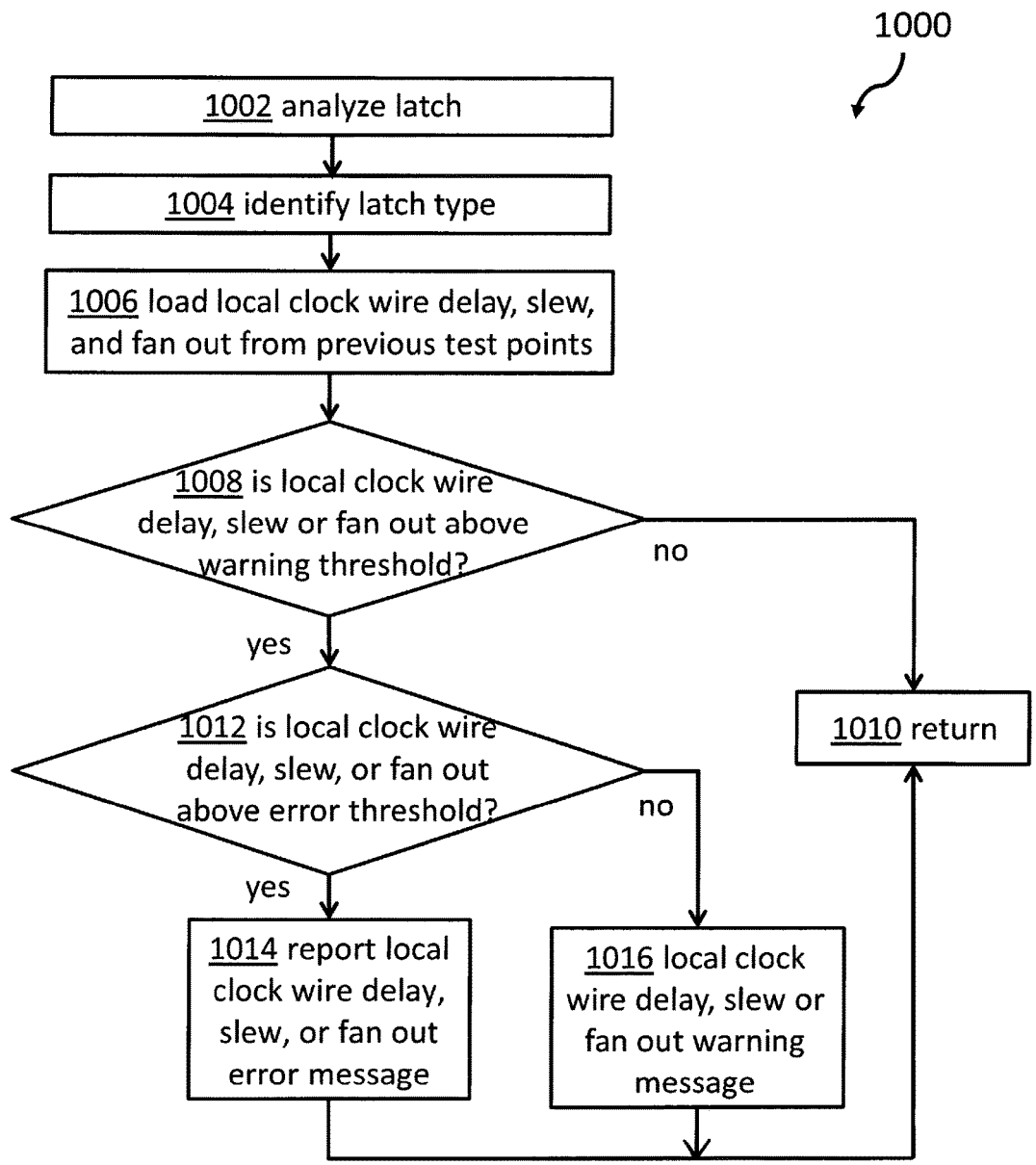
FIG. 10 shows one example of a flowchart of how to analyze a latch, in accordance with an aspect of the present invention.

FIG. 10 shows one example of a flowchart 1000 of how to analyze a latch, 1002. The latch type—e.g., a transparent latch, a master/slave latch, a scannable latch—may be identified, 1004, and local clock wire delay, slew and fan out values from previous test points may be loaded, 1006. It may then be checked, 1008, whether the local clock wire delay, slew or fan out values are above related warning threshold values. In case of "no", the process may end, 1010. In case of "yes", it may be determined, 1012, whether the local clock wire delay, slew or fan out values are above related error threshold values. In case of "yes", local clock wire delay, slew or fan out error messages may be reported, 1014, before the process ends, 1010. In case of "no" of the last determination 1012, local clock wire delay, slew or fan out warning messages may be generated, 1016 before the process ends, 1010.

Figure 11:
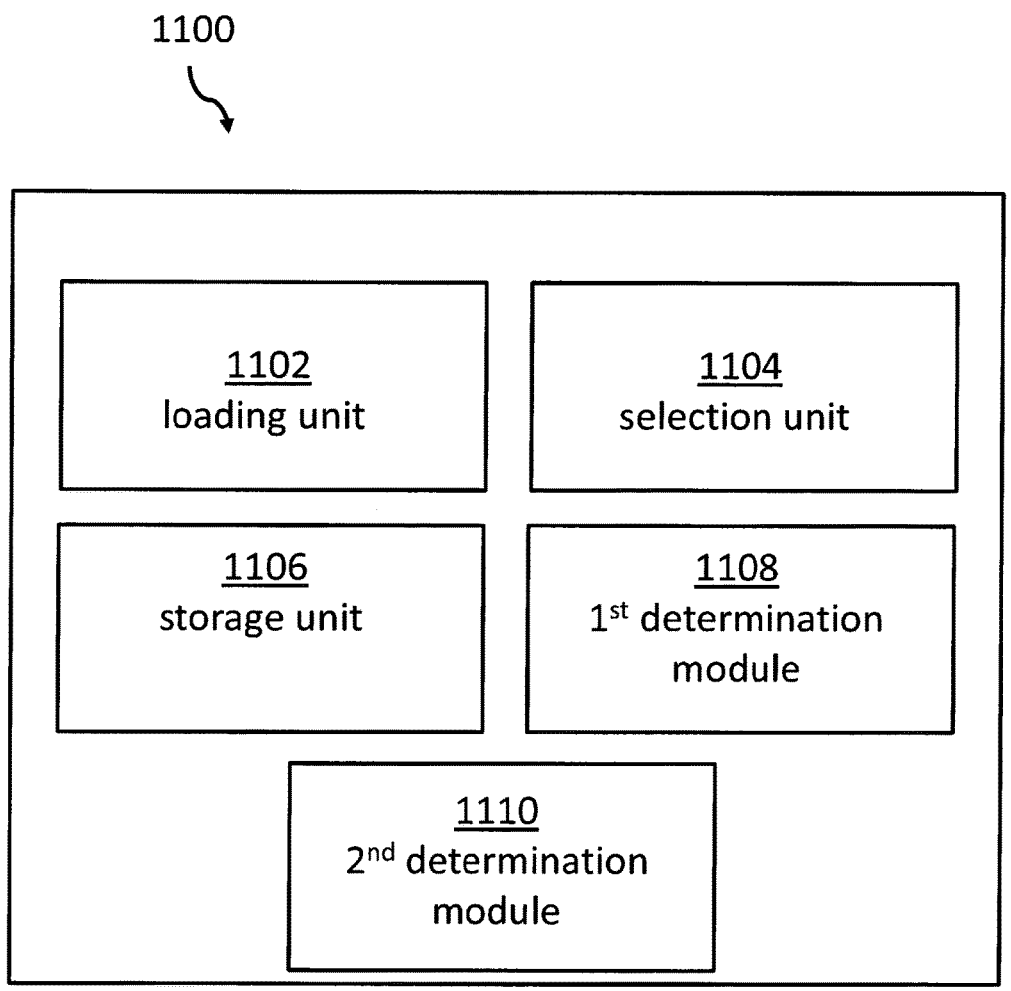
FIG. 11 shows one example of a block diagram of an embodiment of a design circuit analysis system, in accordance with an aspect of the present invention.

FIG. 11 shows one example of a block diagram of an embodiment of a design circuit analysis system 1100, in accordance with one or more aspects of the present invention. The design circuit analysis system may comprise a loading unit 1102 adapted to load results of a static timing analysis run; a selection unit 1104 adapted to select a path from the loaded results; and a storage unit 1106 adapted to provide technology specific context data. Additionally, the design circuit analysis system 1100 may comprise a first (1$^{st}$) determination module 1108 adapted to determine, for one or more (e.g., every) test point of the selected path, design quality parameters for determining a design problem area, and a second (2$^{nd}$) determination module 1110 adapted to determine, for one or more (e.g., every) design problem area, a root cause by analyzing design problem area data in comparison to related ones of the technology specific context data.

Figure 12:
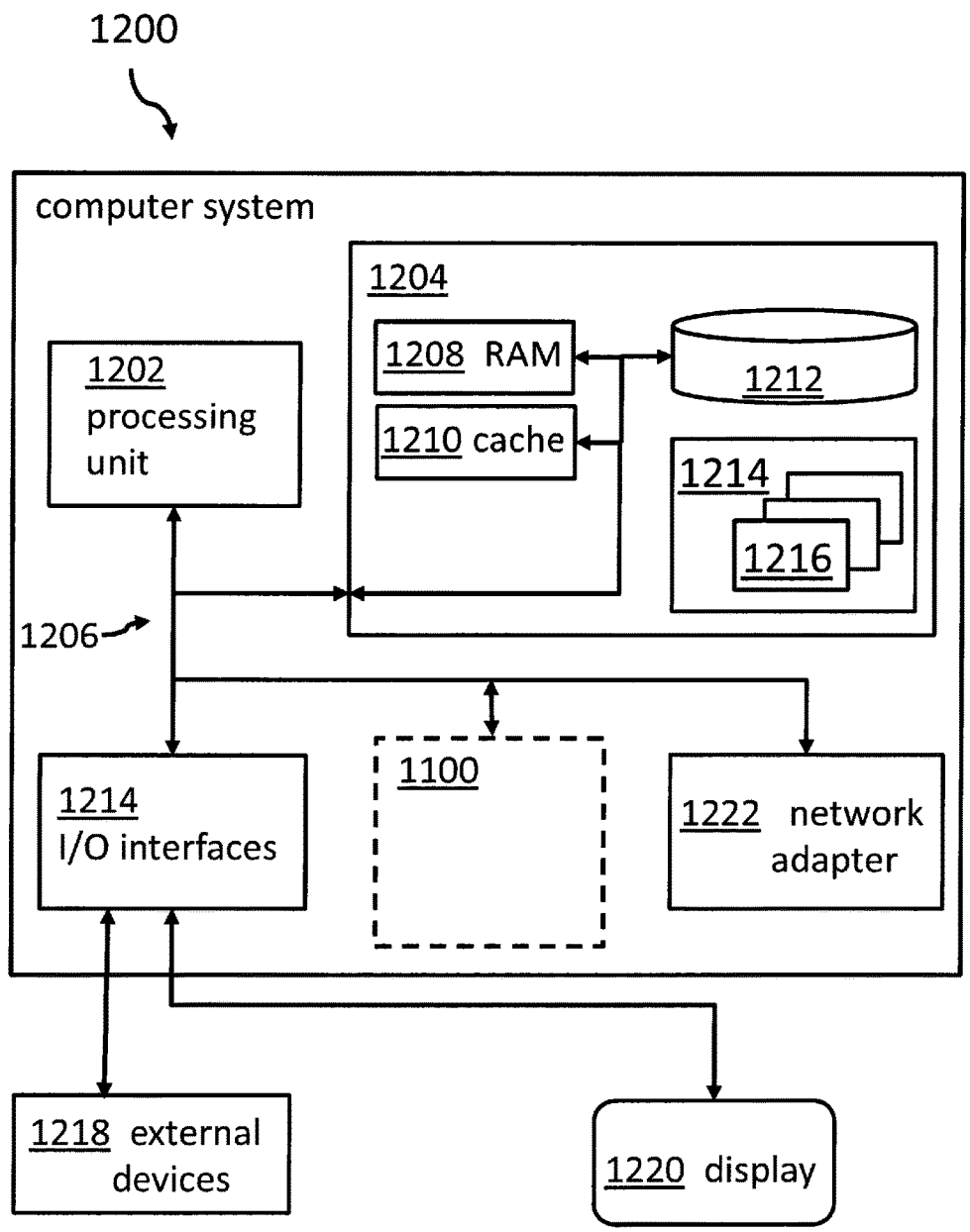
FIG. 12 shows one example of a block diagram showing components of a computer system including the design circuit analysis system.

FIG. 12 shows one example of a block diagram 1200 showing components of a computer system including optionally the design circuit analysis system 1100.

Embodiments of the invention may be implemented together with virtually any type of computer, regardless of the platform being suitable for storing and/or executing program code. FIG. 12 shows, as an example, a computing system 1200 suitable for executing program code related to the proposed method.

The computing system 1200 is only one example of a suitable computer system/server and is not intended to suggest any limitation as to the scope of use or functionality of embodiments of the invention described herein. Regardless, the computing system 1200 is capable of being implemented and/or performing any of the functionality set forth hereinabove. In the computer system 1200, there are components, which are operational with numerous other general purpose or special purpose computing system environments or configurations. Examples of well-known computing systems, environments, and/or configurations that may be suitable for use with computer system/server 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1200 may be described in the general context of computer system-executable instructions, such as program modules, being executed by a computer system 1200. Generally, program modules may include routines, programs, objects, components, logic, data structures, and so on that perform particular tasks or implement particular abstract data types. Computer system/server 1200 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1200 is shown in the form of a general-purpose computing device. The components of computer system/server 1200 may include, but are not limited to, one or more processors or processing units 1202, a system memory 1204, and a bus 1206 that couples various system components, including system memory 1204 to the processor 1202. Bus 1206 represents one or more of any of several types of bus structures, including a memory bus or memory controller, a peripheral bus, an accelerated graphics port, and a processor or local bus using any of a variety of bus architectures. By way of example, and without limitations, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1200 typically includes a variety of computer system readable media. Such media may be any available media that is accessible by computer system/server 1200, and it includes both, volatile and non-volatile media, removable and non-removable media.

The system memory 1204 may include computer system readable media in the form of volatile memory, such as random access memory (RAM) 1208 and/or cache memory 1210. Computer system/server 1200 may further include other removable/non-removable, volatile/non-volatile computer system storage media. By way of example only, storage system 1212 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1206 by one or more data media interfaces. As will be further depicted and described below, memory 1204 may include at least one program product having a set (e.g., at least one) of program modules that are configured to carry out the functions of embodiments of the invention.

Program/utility 1214, having a set (at least one) of program modules 1216, may be stored in memory 1204 by way of example, and no limitation, as well as an operating system, one or more application programs, other program modules, and program data. Each of the operating system, one or more application programs, other program modules, and program data or some combination thereof, may include an implementation of a networking environment. Program modules 1216 generally carry out the functions and/or methodologies of embodiments of the invention, as described herein.

The computer system/server 1200 may also communicate with one or more external devices 1218 such as a keyboard, a pointing device, a display 1220, etc.; one or more devices that enable a user to interact with computer system/server 1200; and/or any devices (e.g., network card, modem, etc.) that enable computer system/server 1200 to communicate with one or more other computing devices. Such communication can occur via Input/Output (I/O) interfaces 1214. Still yet, computer system/server 1200 may communicate with one or more networks such as a local area network (LAN), a general wide area network (WAN), and/or a public network (e.g., the Internet) via network adapter 1222. As depicted, network adapter 1222 may communicate with the other components of computer system/server 1200 via bus 1206. It should be understood that although not shown, other hardware and/or software components could be used in conjunction with computer system/server 1200. Examples, include, but are not limited to: microcode, device drivers, redundant processing units, external disk drive arrays, RAID systems, tape drives, and data archival storage systems, etc.

Additionally, design circuit analysis system 1100 may optionally be attached to the bus system.

As described herein, according to one aspect of the present invention, a method for analyzing an end point report for a design of an electronic circuit may be provided. The method may comprise loading results of a static timing analysis run, selecting a path from the loaded results, and providing technology specific context data. Furthermore, the method may comprise determining, for every test point of the selected path, design quality parameters for determining a design problem area, as well as determining, for every design problem area, a root cause by analyzing design problem area data in comparison to related ones of the technology specific context data.

According to another aspect of the present invention, a design circuit analysis system may be provided. The design circuit analysis system may comprise a loading unit adapted for loading results of a static timing analysis run, a selection unit adapted for a selection of a path from the loaded results, and a storage unit adapted for providing technology specific context data.

Additionally, the design circuit analysis system may comprise a first determination module adapted for a determination, for every test point of the selected path, of design quality parameters for determining a design problem area, and a second determination module adapted for a determination, for every design problem area, of a root cause by analyzing design problem area data in comparison to related ones of the technology specific context data.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

It should be noted that embodiments of the invention are described with reference to different subject-matters. In particular, some embodiments are described with reference to method type claims whereas other embodiments have been described with reference to apparatus type claims. However, a person skilled in the art will gather from herein that, unless otherwise notified, in addition to any combination of features belonging to one type of subject-matter, also any combination between features relating to different subject-matters, e.g., between features of the method type claims, and features of the apparatus type claims, is considered as to be disclosed within this document.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Aspects of the present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage into a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other devices to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit aspects of the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements, if any, in the claims below are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skills in the art without departing from the scope and spirit of aspects of the invention. The embodiments are chosen and described in order to best explain the principles of aspects of the invention and the practical application, and to enable others of ordinary skills in the art to understand aspects of the invention for various embodiments with various modifications, as are suited to the particular use contemplated.

What is claimed is:

1. A method comprising:
   performing a static timing analysis simulation run on an electronic circuit design to determine projected timing of the electronic circuit, absent a full simulation of the electronic circuit, the static timing analysis run producing end point results for the electronic circuit design;
   automatically processing, by an electronic circuit design tool, the end point results for the electronic circuit design, including:
      loading the end point results of the static timing analysis run, the results being obtained from the static timing analysis simulation to determine the projected timing of the electronic circuit absent the full simulation of the electronic circuit;
      selecting a path from said loaded results;
      providing technology specific context data denoting characteristic device values for specific device type manufactures using specific manufacturing technologies;
      determining for one or more test points of the selected path, design quality parameters for determining a design problem area, the one or more test points corresponding to one or more device pins in the electronic circuit design;
      determining, for the design problem area, a root cause by analyzing design problem area data in comparison to related ones of said technology specific context data, the root cause being identified as having a highest relative problem importance;
   automatically generating, by the electronic circuit design tool, at least one design change for enhancing the electronic circuit based on the automatic processing to facilitate meeting predefined design criteria for the electronic circuit, the at least one design change addressing the root cause of the design problem area; and
   providing, by the electronic circuit design tool, the automatically generated at least one design change for use in fixing the design problem area of the root cause of the electronic circuit design;
   manufacturing the electronic circuit pursuant to the electronic circuit design as fixed via the at least one design change.

2. The method according to claim 1, wherein said technology specific context data comprises at least one of a threshold value, a typical delay, or a maximum slew value for one or more timing phases.

3. The method according to claim 1, wherein said design quality parameters comprise at least one of a high delay, a signal slew, or a placement of a device within a layout of said electronic circuit.

4. The method according to claim 3, wherein based on said design quality parameters comprising the placement, the computer-implemented method further comprises:
   determining one test point position, the one test point position being a last or a penultimate test point position;
   determining a placement delta of a current test point in relation to said one test point position;
   loading a global path direction vector;
   determining whether said placement delta is following said global path direction vector;
   determining whether said placement delta is above an ignore placement mismatch threshold; and
   determining whether said placement delta is above a critical placement mismatch threshold.

5. The method according to claim 1, wherein at least one of a color rendering attribute or a test point design quality parameter is assigned to a test point relating to the design problem area.

6. The method according to claim 1, wherein a test point of the one or more test points is selected out of a group comprising a pin, a wire delay, an adjust, a device delay, and an assertion.

7. The method according to claim 6, wherein based on said test point being of a type wire delay, the computer-implemented method further comprises:
   determining a source pin load and a related sink pin slew.

8. The method according to claim 6, wherein based said test point being of a type device delay, the computer-implemented method further comprises:
   analyzing at least one of a device, a buffer, or a latch.

9. The method according to claim 8, wherein said analyzing said device comprises:
   determining at least one of a device voltage threshold value, a device primary output slew value, or a device primary output load value in comparison to a device size, and a device fan out value.

10. The method according to claim 8, wherein based on said device being analyzed being a buffer, the computer-implemented method further comprises:
- determining a warning threshold value and an error threshold for a primary input slew of the buffer;
- based on a primary input slew value of said buffer being better than a primary output slew value of said buffer, reporting an obsolete buffer error message; and
- based on said primary input slew value being better than an error threshold value, reporting an obsolete buffer error message.

11. The method according to claim 8, wherein said device being analyzed is a latch, and wherein said analyzing comprises:
- identifying a latch type; and
- loading a local clock wire delay value, a slew value, and a fan-out value from a previous test point in said selected path.

12. A computer system comprising:
- a memory; and
- a processing device in communication with the memory, wherein the computer system is configured to perform a method, said method comprising:
  - performing a static timing analysis simulation run on an electronic circuit design to determine projected timing of the electronic circuit, absent a full simulation of the electronic circuit, the static timing analysis run producing end point results for the electronic circuit design;
  - automatically processing, by an electronic circuit design tool, the end point results for the electronic circuit design, including:
    - loading the end point results of the static timing analysis run, the results being obtained from the static timing analysis simulation to determine the projected timing of the electronic circuit absent the full simulation of the electronic circuit;
    - selecting a path from said loaded results;
    - providing technology specific context data denoting characteristic device values for specific device type manufactures using specific manufacturing technologies;
    - determining for one or more test points of the selected path, design quality parameters for determining a design problem area, the one or more test points corresponding to one or more device pins in the electronic circuit design;
    - determining, for the design problem area, a root cause by analyzing design problem area data in comparison to related ones of said technology specific context data, the root cause being identified as having a highest relative problem importance;
    - automatically generating, by the electronic circuit design tool, at least one design change for enhancing the electronic circuit based on the automatic processing to facilitate meeting predefined design criteria for the electronic circuit, the at least one design change addressing the root cause of the design problem area; and
  - providing, by the electronic circuit design tool, the automatically generated at least one design change for use in fixing the design problem area of the root cause of the electronic circuit; and
  - manufacturing the electronic circuit pursuant to the electronic circuit design as fixed via the at least one design change.

13. The computer system according to claim 12, wherein said design quality parameters comprise at least one of a high delay, a signal slew, or a placement of a device within a layout of said electronic circuit.

14. The computer system according to claim 13, wherein based on said design quality parameters comprising the placement, the method further comprises:
- determining one test point position, the one test point position being a last or a penultimate test point position;
- determining a placement delta of a current test point in relation to said test point position;
- loading a global path direction vector;
- determining whether said placement delta is following said global path direction vector;
- determining whether said placement delta is above an ignore placement mismatch threshold; and
- determining whether said placement delta is above a critical placement mismatch threshold.

15. The computer system according to claim 12, wherein a test point is selected out of a group comprising a pin, a wire delay, an adjust, a device delay, and an assertion.

16. A computer program product for an electronic circuit design tool to enhance an electronic circuit design, the computer program product comprising:
- a non-transitory computer readable storage medium readable by a processing circuit and storing instructions for execution by the processing circuit for performing a method comprising:
  - performing a static timing analysis simulation run on an electronic circuit design to determine projected timing of the electronic circuit, absent a full simulation of the electronic circuit, the static timing analysis run producing end point results for the electronic circuit design;
  - automatically processing, by the electronic circuit design tool, the end point results for the electronic circuit design, including:
    - loading the end point results of the static timing analysis run, the results being obtained from the static timing analysis simulation to determine the projected timing of the electronic circuit absent the full simulation of the electronic circuit;
    - selecting a path from said loaded results;
    - providing technology specific context data denoting characteristic device values for specific device type manufactures using specific manufacturing technologies;
    - determining for one or more test points of the selected path, design quality parameters for determining a design problem area, the one or more test points corresponding to one or more device pins in the electronic circuit design;
    - determining, for the design problem area, a root cause by analyzing design problem area data in comparison to related ones of said technology specific context data, the root cause being identified as having a highest relative problem importance;
    - automatically generating, by the electronic circuit design tool, at least one design change for enhancing the electronic circuit based on the automatic processing to facilitate meeting predefined design criteria for the electronic circuit, the at least one design change addressing the root cause of the design problem area; and providing, by the electronic circuit design tool, the automatically generated at least one design change for use in fixing the design problem area of the root cause of the electronic circuit; and manufacturing the electronic circuit pursuant to the electronic circuit design as fixed via the at least one design change.

17. The computer program product according to claim 16, wherein said design quality parameters comprise at least one of a high delay, a signal slew, or a placement of a device within a layout of said electronic circuit.

18. The computer program product according to claim 17, wherein based on said design quality parameters comprising the placement, the method further comprises:

determining one test point position, the one test point position being a last or a penultimate test point position;

determining a placement delta of a current test point in relation to said test point position;

loading a global path direction vector;

determining whether said placement delta is following said global path direction vector;

determining whether said placement delta is above an ignore placement mismatch threshold; and determining whether said placement delta is above a critical placement mismatch threshold.

19. The computer program product according to claim 16, wherein a test point is selected out of a group comprising a pin, a wire delay, an adjust, a device delay, and an assertion.

20. The computer program product according to claim 19, wherein based said test point being of a type device delay, the method further comprises:

analyzing at least one of a device, a buffer, or a latch, wherein said analyzing said device comprises determining at least one of a device voltage threshold value, a device primary output slew value, or a device primary output load value in comparison to a device size, and a device fan out value.

* * * * *